United States Patent [19]

Yabe

[11] Patent Number: 5,218,597
[45] Date of Patent: Jun. 8, 1993

[54] OPTICAL READING AND WRITING DEVICE

[75] Inventor: Mitoru Yabe, Gunma, Japan

[73] Assignee: Mitsubishi Denki Kabushiki Kaisha, Japan

[21] Appl. No.: 913,299

[22] Filed: Jul. 14, 1992

[30] Foreign Application Priority Data

Jul. 23, 1991 [JP] Japan .................................. 3-182307

[51] Int. Cl.$^5$ .............................................. G11B 7/09
[52] U.S. Cl. ..................................... 369/118; 369/112; 369/44.24
[58] Field of Search ..................... 369/118, 44.24, 112, 369/117

[56] References Cited

U.S. PATENT DOCUMENTS

| 4,636,628 | 1/1987 | Tsukai | 369/44.24 |
| 4,956,833 | 9/1990 | Kokado et al. | 369/118 |
| 5,034,941 | 7/1991 | Kasai et al. | 369/112 |
| 5,072,437 | 12/1991 | Urikuma | 369/118 |

FOREIGN PATENT DOCUMENTS 61-198436 3/1986 Japan .
62-73435 6/1987 Japan .

Primary Examiner—Paul M. Dzierzynski
Assistant Examiner—Kiet T. Nguyen
Attorney, Agent, or Firm—Wolf, Greenfield & Sacks

[57] ABSTRACT

A thruhole 23 is provided with a movable member so that a light beam irradiated from an LED passes through the thruhole and is received by a photo detector for positional detection whereby the position of an objective lens relative to the light receiving groove of an information recording medium is detected. At the same time, a light beam passing through the thruhole 46 and reflected by the information recording medium is received by a photo detector for inclination detection whereby the inclination angle of the objective lens against the information recording medium is detected.

3 Claims, 16 Drawing Sheets

NORMAL TRACKING ERROR SIGNAL TS

DISPLACEMENT d OF OBJECTIVE LENS IN TRACKING DIRECTION

OBJECTIVE LENS POSITION DETECTION SIGNAL LPS

DISPLACEMENT d OF OBJECTIVE LENS IN TRACKING DIRECTION

CORRECTED TRACKING ERROR SIGNAL C-TS

DISPLACEMENT d OF OBJECTIVE LENS IN TRACKING DIRECTION

OPTICAL READING AND WRITING DEVICE

BACKGROUND OF THE INVENTION

1. Field of the Invention

The present invention relates to an optical reading and writing device for reading and writing information on an optical information recording medium.

2. Description of the Prior Art

An optical reading and writing device requires control in the track direction for writing signals on or reading signals from an optical information recording medium concentrically or spirally without contacting the medium. There have been proposed various track direction control systems, one of which is the push-pull method which uses diffracted light from the signal bit or guide groove of the optical information reading and writing device to control the track direction.

FIG. 15 is an exploded perspective view of key components of the optical reading and writing device. FIG. 16 illustrates the principle of the push-pull method, and FIG. 17 illustrates the drawback of the push-pull method which is caused by the displacement of the guide groove and an objective lens from the neutral point of the objective lens by the same distance. FIG. 18 shows the tracking error signal of FIG. 17, and FIG. 19 shows the drawback of the push-pull method which is caused by the inclination of the objective lens against an optical disk. FIG. 21 is a sectional view of a prior art optical pick-up which eliminates the drawback of the push-pull method. FIG. 22 illustrates the relationship between the displacement d of the objective lens from the neutral point of the objective lens and an objective lens position detection signal LPS. FIG. 23 illustrates the relationship between the inclination $\theta$ of the objective lens against the optical disk and a tilt sensor signal DTS. FIG. 24 shows the relationship between the displacement d of the objective lens in the tracking direction and a normal tracking error signal TS. FIG. 25 shows the relationship between the displacement d of the objective lens in the tracking direction and the objective lens position detection signal LPS. FIG. 26 illustrates the relationship between the displacement d of the objective lens in the tracking direction and a corrected tracking error signal C-TS.

In these figures, reference numeral 1 represents an optical reading and writing device, 2 an optical information recording medium (hereinafter referred to as "information recording medium"), 3 an optical pick-up for writing information on or reading information from the recording medium 2, 4 the base of the optical pick-up 3, 5 a slide shaft for moving the optical pick-up base 4 in the horizontal direction (shown by an arrow S), 6 a movable holder provided on top of the base 4 and having an objective lens 7, and 8 a shaft provided on top of the base 4 and extending throughout the bearing 9 of the movable holder 6. 10 represents laser light irradiated from the objective lens onto a guide groove provided spirally on the recording medium 2 and forming a converging spot 12 at the center of the guide groove 11. 13 represents a convex lens on the opposite side of and in parallel to the information recording medium 2 of the objective lens 7. 14 indicates a two-piece photo detector which has two light receiving surfaces 15 and 16, and is located on the opposite side of the convex lens 13. A differential amplifier 17 has input terminals (+) and (−) connected to these two light receiving surfaces 15 and 16 of the convex lens 13, and is responsive to an output from the light receiving surfaces 15 and 16 to generate the tracking error signal TS. 18 and 19 are diffracted light distributions which are produced when the converging spot 12 is diffracted by both edges of the guide groove 11. 20 and 21 are diffracted light distributions projected onto the surface of the two-piece photo detector 14. 22 represents a balancer having a thruhole 23 at the center thereof. A thruhole 24 is also provided on the movable holder 6 corresponding to this thruhole 23.

Reference numeral 25 indicates a focusing control coil disposed at the bottom of the movable holder 6 and provided in a magnetic circuit constituted by a focusing control yoke 26 and a focusing control magnet 27. 28 represents a light emitting diode for position detection which irradiates a light beam 29 (hereinafter referred to as "LED"). 30 indicates a two-piece photo detector for position detection which is fixed to the base 4 so that a parting line becomes perpendicular to the moving direction of the balancer 22 and which receives the light beam 31 limited by the thruhole 23. Denoted at 23 is a tilt sensor which consists of a light emitting section 33, a light receiving section 34 which is a two-piece photo detector, and a lens section 35, and is fixed to a position over a straight line connecting the objective lens 7 and the shaft of the base 4 and is opposed to the information recording medium 2.

With reference to FIG. 15, the operation of the whole optical reading and writing device will be described. The optical reading and writing device rotates the information recording medium 2, and irradiates the laser beam 10 from the objective lens 7 to the guide groove 11 for writing information on the optical disk 2 or reading information from the optical disk 2. To change the converging spot 12 of the laser light from the objective lens in accordance with the displacement of the guide groove 11 caused by the rotation of the optical disk 2, the base 4 is moved along the slide shaft 5 (shown by an arrow S) for rough positioning of the objective lens relative to the guide groove. Thereafter, the objective lens 7 is moved in the focusing direction (shown by an arrow F) and the tracking direction (shown by an arrow T) for fine positional adjustment. Therefore, such controls as a focus servo for the control of the movement of the objective lens 7 relative to the optical disk 2 in the focusing direction and a tracking servo for the control of the movement in the tracking direction are required.

With reference to FIG. 16, the principle of the push-pull method, a typical example of the tracking servo, will be described hereafter. When the objective lens 7 is located at the center of the guide groove 11, the strengths of diffracted light distributions 20 and 21 become equal in accordance with diffracted light distributions 18 and 19, and the tracking error signal TS outputted from the differential amplifier 17 becomes zero. However, when the position of the objective lens 7 relative to the guide groove 11 is changed for such reasons as the eccentricity of the information recording medium 2, the strengths of the diffracted light distributions 18 and 19 are not equal, and accordingly, the output TS of the differential amplifier 17 becomes positive or negative. Thereby, the control of the tracking direction is performed so that the output TS becomes zero, and the objective lens 7 is displaced and moved in the direction of X shown in the figure.

With reference to FIGS. 17 to 20, the problems of the push-pull method will be described in the following.

FIG. 17 illustrates displaced guide groove 11 and objective lens 7 from the neutral point of the objective lens 7 by a distance d. In this condition, although the converging spot 12 is located at the center of the guide groove 11, the diffracted light distributions 20 and 21 projected onto the surface of the two-piece photo detector 14 are not equally incident upon the two light receiving surfaces 15 and 16 with the result that the output TS of the differential amplifier does not become zero. Namely, a tracking offset occurs. Therefore, the amount of the tracking offset of TS becomes large as the displacement d increases as shown in FIG. 18, and accordingly, it is impossible to perform tracking control properly.

FIG. 19 illustrates an inclination of the information recording medium 2 at an angle of $\theta$ against the objective lens 7. In this condition, although the converging spot 12 is located at the center of the guide groove 11, diffracted light distributions 18 and 19 become unequal, diffracted light distributions 20 and 21 projected onto the surface of the two-piece photo detector 14 are not equally incident upon the two light receiving surfaces 15 and 16 with the result that the output TS of the differential amplifier 17 does not become zero. Namely, a tracking offset occurs. Therefore, the amount of the tracking offset of TS becomes large as the inclination $\theta$ increases as shown in FIG. 20, and accordingly, it is impossible to perform tracking control properly.

As described in the foregoing, the push-pull method is a simple system utilizing diffracted light, but has the drawback that it is impossible to achieve a wide movable range in the tracking direction and a highly reliable tracking servo signal because the tracking error signal is offset by the displacement of the objective lens 7 in the tracking direction or the inclination of the information recording medium 2.

Improvement made on this push-pull method to overcome the aforementioned problem is shown in Japanese Patent Nos.61-198436 and 62-73435.

With reference to FIGS. 21 to 26, improvements made on the conventional push-pull method will be described hereafter.

A light beam 29 irradiated from the LED 28 becomes a light beam 31 which has a radiation range limited by the thruhole 23 of the balancer 22 provided on the movable holder 6 and is received by the two-piece photo detector 30 for positional detection. Thereafter, the movable holder 6 turns on the shaft 8, whereby the thruhole 23 is displaced, and the light beam 31 is also displaced over the two-piece photo detector 30 for positional detection. An objective lens position detection signal LPS shown in FIG. 22 can be achieved by taking a difference between outputs of the two-piece photo detector 30 for positional detection. Since a light beam irradiated from the light emitting section of the tilt sensor 32 fixed to the base 4 is reflected by the information recording medium 2 and returns to the light receiving section 34, a tilt detection signal DTS corresponding to the inclination $\theta$ of the information recording medium 2 against the base 4 can be achieved as shown in FIG. 23 by taking a difference between outputs of the light receiving section 34.

The tracking error signal TS of the normal push-pull method has such a waveform as to show that a tracking offset is caused by the displacement d of the objective lens 7 as shown in FIG. 24. Therefore, it is possible to achieve a corrected tracking error signal C-TS always free from tracking offset by calculating a difference between LPS shown in FIG. 25 and TS despite the displacement of the objective lens 7 in the tracking direction shown in FIG. 26. Therefore, it is possible to achieve a wide movable range in the tracking direction and perform tracking control properly. Since the base 4 has an unshown base inclination function which is actuated so that the tilt detection signal DTS becomes zero, the inclination of the base 4 against the information recording medium 2 is kept constant even if the information recording medium 2 is inclined. Namely, it is possible to prevent the occurrence of a tracking offset because the information recording medium 2 is not inclined against the objective lens.

The conventional optical reading and writing device is structured as described in the foregoing, and requires various optical devices for correcting a tracking offset such as the light emitting diode 28, the two-piece photo detector 30 for positional detection, the light emitting section 33 and the light receiving section 34. Therefore, the structure of the conventional optical reading and writing device is complex and has such problems as: (1) complex assembly due to an increased number of FPCs and lead wires of the light detecting section which supply and receive a current for photoelectrical conversion, (2) bulky size because the tilt sensor 32 needs to be opposed to the information recording medium 2, and (3) limitation of design freedom because of the complex structure of the device, for example when a disk cartridge is used to protect the information recording medium 2.

SUMMARY OF THE INVENTION

In view of the aforementioned problems with the prior art, it is therefore an object of the invention to achieve an optical reading and writing device which can correct a tracking offset with a simple structure and can enhance design freedom.

The optical reading and writing device of the present invention comprises: (1) an optical information recording disk medium having a light receiving groove, (2) an optical head moving member moving opposed to this recording medium, (3) a movable member provided on this optical head moving member and having an objective lens as an integral part thereof, (4) a light source for irradiating light in the direction of the recording medium provided on the optical head moving member, (5) a first thruhole for transmitting light from the light source in the direction of the recording medium, and (6) a photo detector provided on the movable member which has first and second light receiving surfaces and a second thruhole extending through the first and second light receiving surfaces between the first thruhole and the recording medium. Light passing through the first thruhole is received by the first light receiving surface whereby the position of the objective lens relative to the light receiving groove is detected. At the same time, light passing through the second thruhole and reflected by the recording medium is received by the second light receiving surface whereby the inclination angle of the objective lens against the recording medium is detected.

The light source is inclined against the recording medium so that light passing through the second thruhole and reflected by the recording medium is received by a part of the second light receiving surface other than the second thruhole.

An optical lens is provided within the second thruhole to enlarge light passing through the second thruhole which is then reflected by the recording medium and received by the second receiving plane.

In the optical reading and writing device of the present invention, light irradiated from the light source passes through the first thruhole in the direction of the recording medium as a substantially parallel light beam, and is received by the first light receiving surface of the photo detector whereby the position of the objective lens relative to the light receiving groove of the information recording medium is detected, and at the same time, a light beam passing through the second thruhole and reflected by the recording medium is received by the second light receiving surface whereby the inclination angle of the objective lens against the information recording medium is detected. Through these detections, a tracking offset is corrected.

The light source is inclined against the recording medium, and light is received by a part of the second light receiving surface other than the second thruhole, whereby the detection accuracy of the inclination angle of the objective lens against the information recording medium is improved.

Furthermore, an optical lens is provided in the second thruhole to expand the light receiving range of the second light receiving surface in order to improve the detection accuracy of the inclination angle of the objective lens against the information recording medium.

The above and other objects, features and advantages of the invention will become more apparent from the following description when taken in conjunction with the accompanying drawings.

BRIEF DESCRIPTION OF THE DRAWINGS

FIG. 8 is a sectional view of the optical pick-up of an optical reading and writing device according to Embodiment 2 of the present invention;

DESCRIPTION OF THE PREFERRED EMBODIMENT

Embodiment 1

Figure 1:
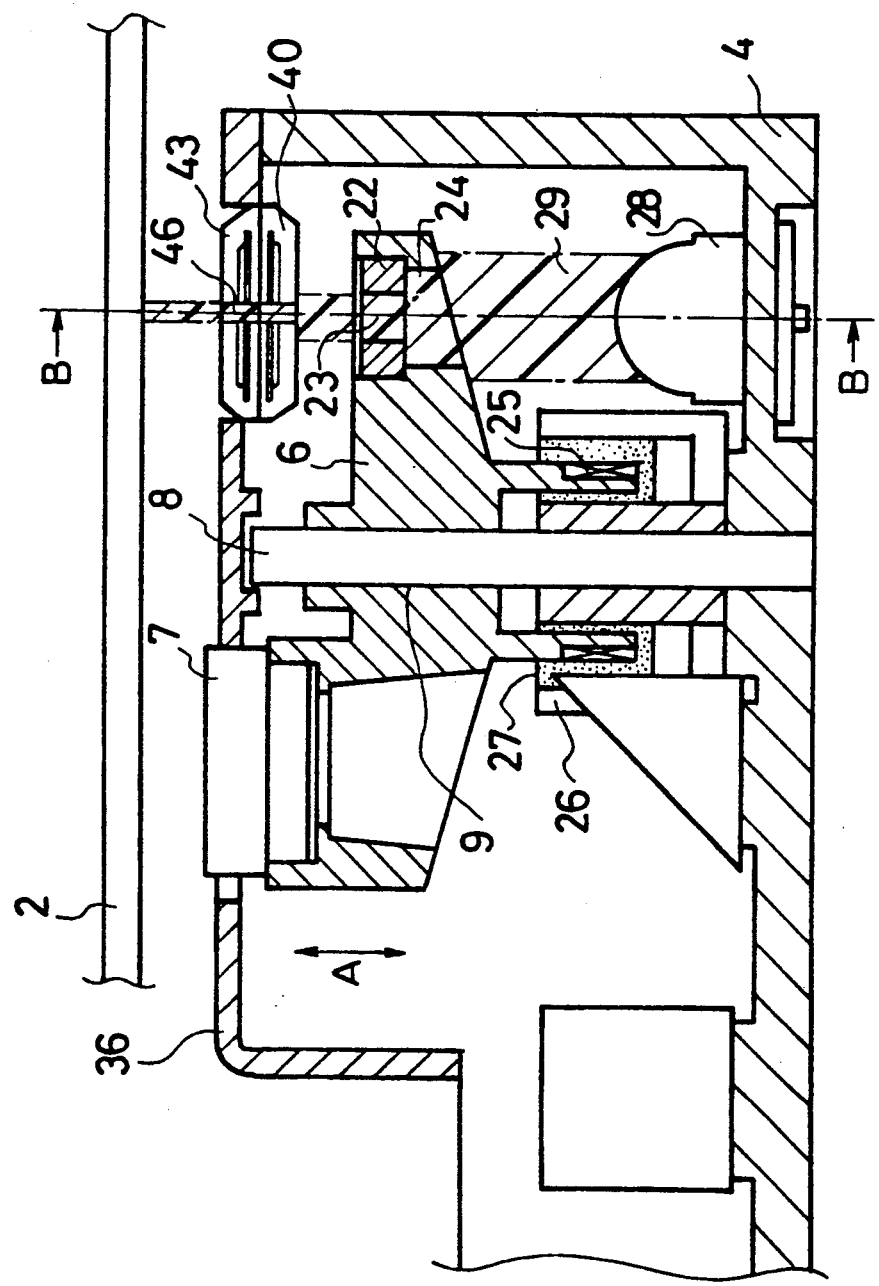
FIG. 1 is a sectional view of the optical pick-up of an optical reading and writing device according to Embodiment 1 of the present invention.
Figure 2:
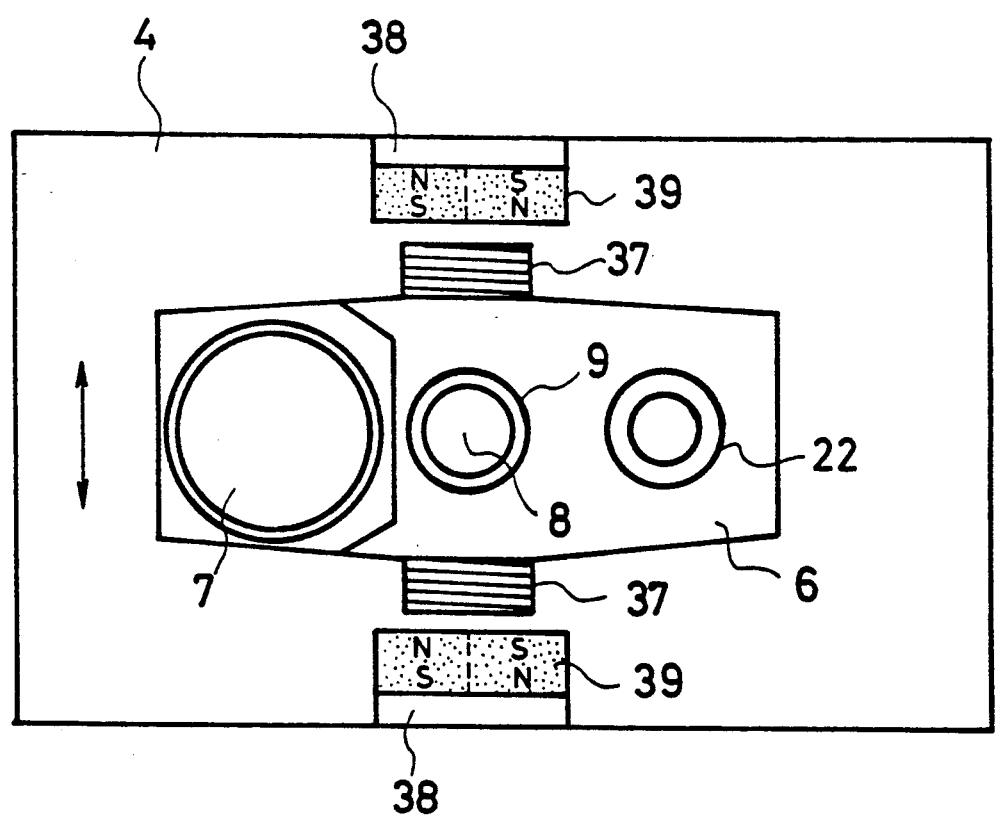
FIG. 2 is a top view of the optical pick up of Embodiment 1.
Figure 3:
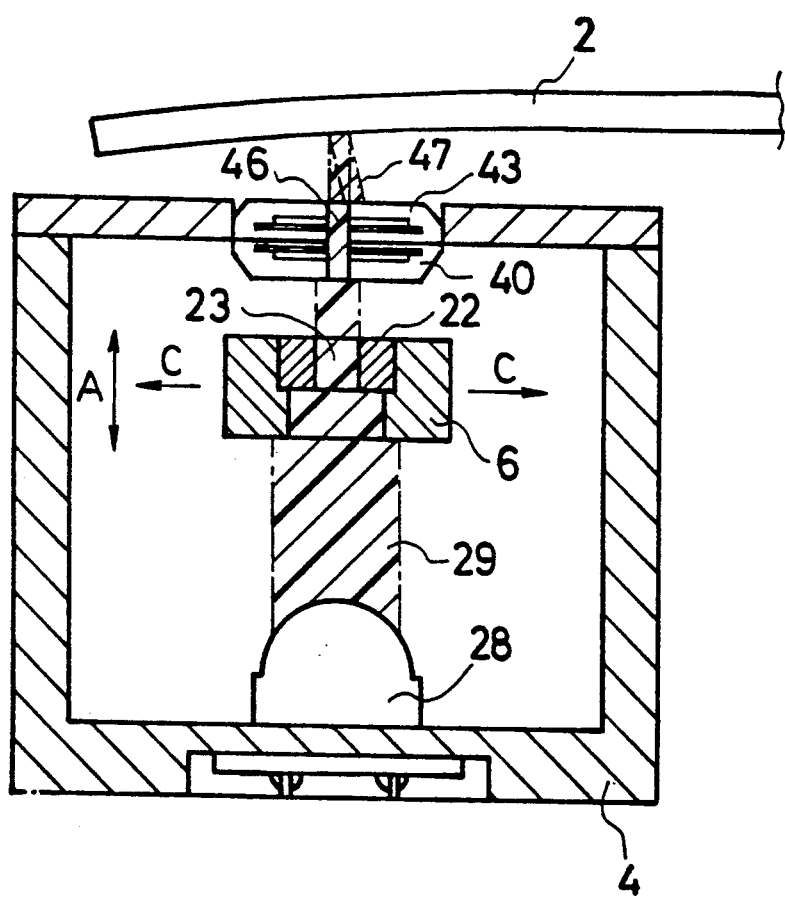
FIG. 3 is a B—B sectional view of FIG. 1 of Embodiment 1.
Figure 4:
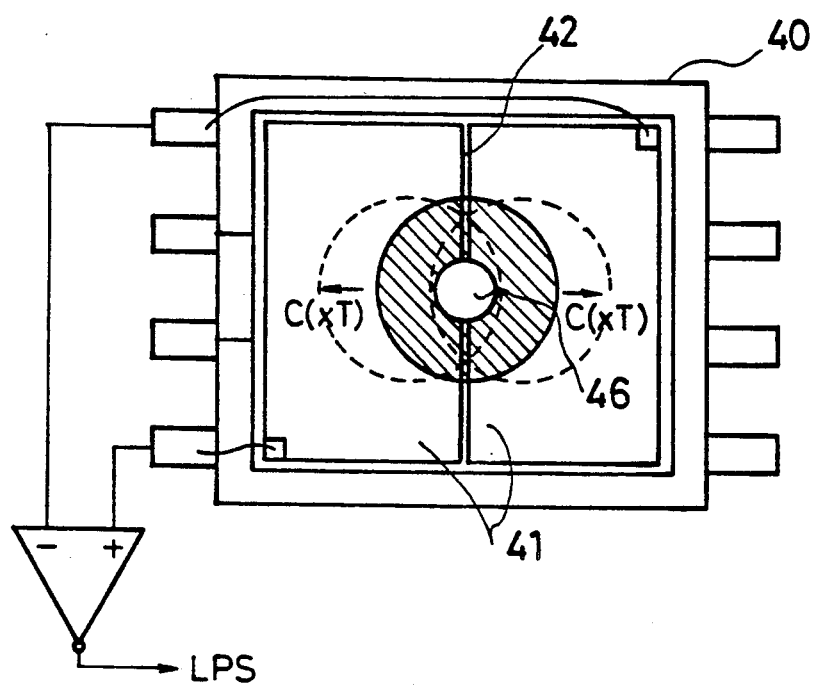
FIG. 4 illustrates the principle of detecting the objective lens position detection signal of Embodiment 1.
Figure 5:
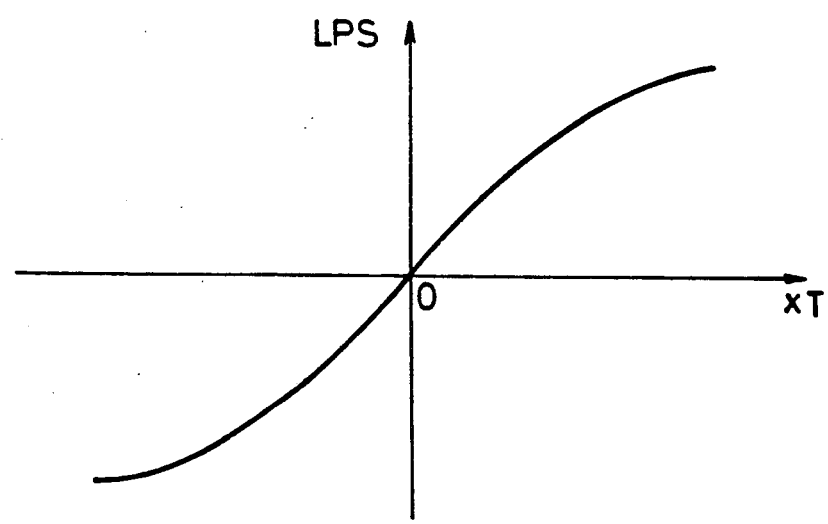
FIG. 5 illustrates the relationship between the moving distance of a light beam over the photo detector for positional detection and the objective lens position detection signal of Embodiment 1.
Figure 6:
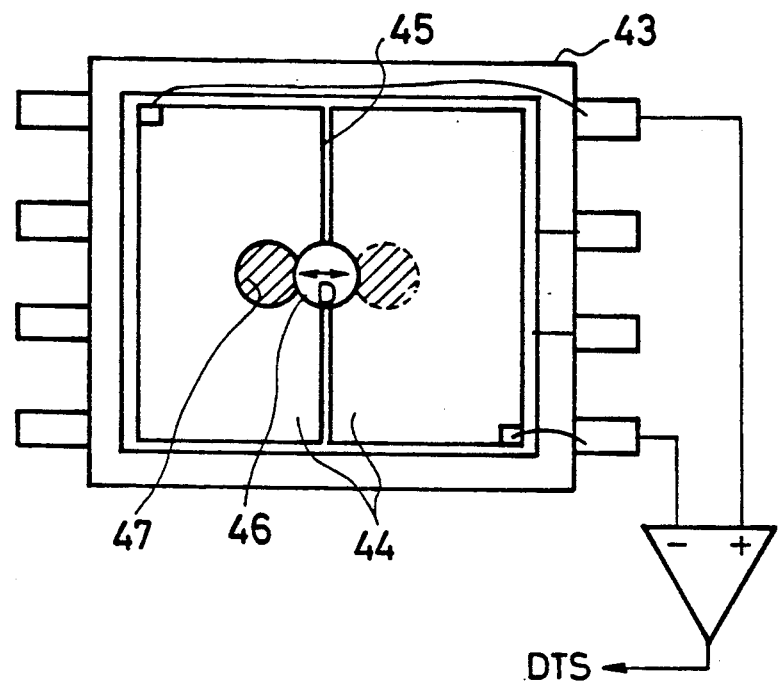
FIG. 6 illustrates the principle of detecting the tilt sensor signal of Embodiment 1.

FIG. 1 is a sectional view of the optical pick-up of an optical reading and writing device according to an embodiment of the present invention. FIG. 2 is a top view of the optical pick-up, and FIG. 3 is a B—B sectional view of FIG. 1. FIG. 4 illustrates the principle of detecting an objective lens position detection signal LPS. FIG. 5 illustrates the relationship between the moving distance $x_T$ of a light beam in the direction of C in the light receiving section of a photo detector for positional detection and the objective lens position detection signal LPS. FIG. 6 illustrates the principle of detecting a tilt sensor signal DTS, and FIG. 7 also illustrates the relationship between the inclination $\theta_D$ of the objective lens against the optical disk and the tilt sensor signal DTS.

In the figures, reference numerals 2, 4, 6–9 and 22–28 represent the same or equivalent parts as FIGS. 15 to 21 of the prior art, and accordingly, their description is omitted. Reference numeral 36 represents a cover, 37 a tracking control coil provided on the side of the movable holder 6, and 38 a tracking control yoke provided on the base 4 having a tracking control magnet magnetized positively and negatively and forming a magnetic circuit for the tracking control coil 37. 40 represents a two-piece photo detector for detecting the position of the objective lens (hereinafter referred to as "photo detector for positional detection") which is disposed in such a way that the light receiving surface 41 thereof is opposed to the balancer 22 and a parting line 42 is perpendicular to the moving direction of the balancer 22

(the direction of C in FIG. 3). 43 represents a two-piece photo detector for detecting the inclination angle of the objective lens (hereinafter referred to as "photo detector for inclination detection") which is provided on the side of the non-light receiving surface of the photo detector 40 for positional detection so that the light receiving surface thereof 44 is opposed to the information recording medium 2. In addition, the parting line 45 of the photo detector 40 for positional detection is provided at the same location as the parting line 42, and moreover, a thruhole 46 extending through the photo detector 40 for positional detection and the photo detector 43 for inclination detection is provided at the center of these two parting lines. 47 represents a light spot which is reflected light of a light beam 29 irradiated onto the optical information recording medium.

The thruholes 23 and 46 as well as the optical axis of the LED 28 are positioned on the same axis when the objective lens is at the neutral position in the tracking direction (direction C of FIG. 3). Furthermore, the diameter of the beam 29 irradiated from the LED 28 is much larger than that of the thruhole 23 so that even if the movable holder 6 moves in the direction of C, the thruhole 23 is not off the beam 29. The beam 29 limited by the thruhole 23 is designed to be large enough to prevent it from being off the thruhole 46 even if the movable holder 6 moves in the direction of C.

The base 4 corresponds to an optical head moving member, the movable holder 6 to a movable member, the position detecting LED 28 to a light source, the thruholes 23 and 24 to a first thruhole, the two-piece photo detector 40 for detecting the position of the objective lens and the two-piece photo detector 43 for detecting the inclination angle of the objective lens to a photo detector, and the thruhole 46 to a second thruhole.

The operation of the optical reading and writing device of the present invention will be described hereafter.

With reference to FIG. 1, FIG. 4 and FIG. 5, the detection of the position of the objective lens in the tracking direction (direction C in FIG. 4) will first be described. The light beam 29 irradiated from the LED 28 passes through the thruhole 23 and reaches the photo detector 40 for positional detection to become a light spot. This light spot is displaced over the light receiving surface 41 as the movable holder 6 moves in the tracking direction. Then the photoelectrical conversion of the light spot is performed to output an electrical signal from each of the two light receiving surfaces 41 of the two-piece photo detector 40 for positional detection. The difference between the two electrical signals is extracted by such means as a differential amplifier to obtain the position detection signal LPS. As a result, LPS relative to the follow-up amount $x_T$ in the tracking direction has such a characteristic as shown in FIG. 5. The tracking error signal is corrected with this position detection signal LPS to eliminate a tracking offset and perform proper tracking control.

Figure 7:
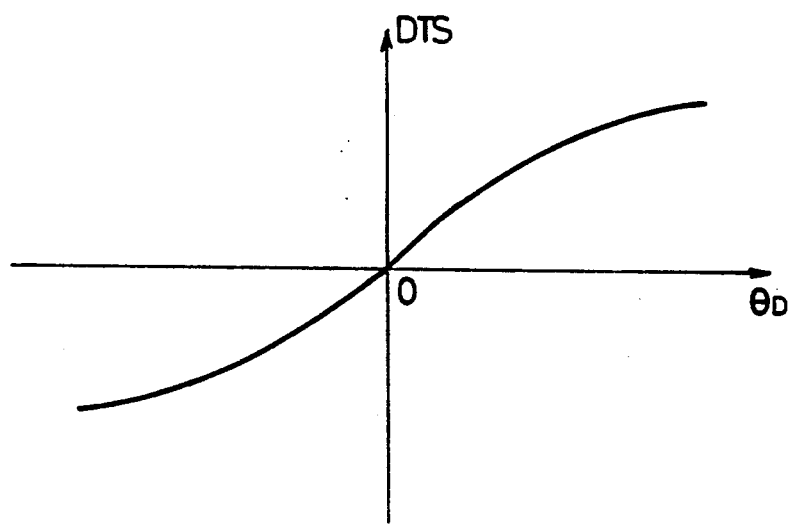
FIG. 7 illustrates the relationship between the inclination of the objective lens and the tilt sensor signal of Embodiment 1.
Figure 3:
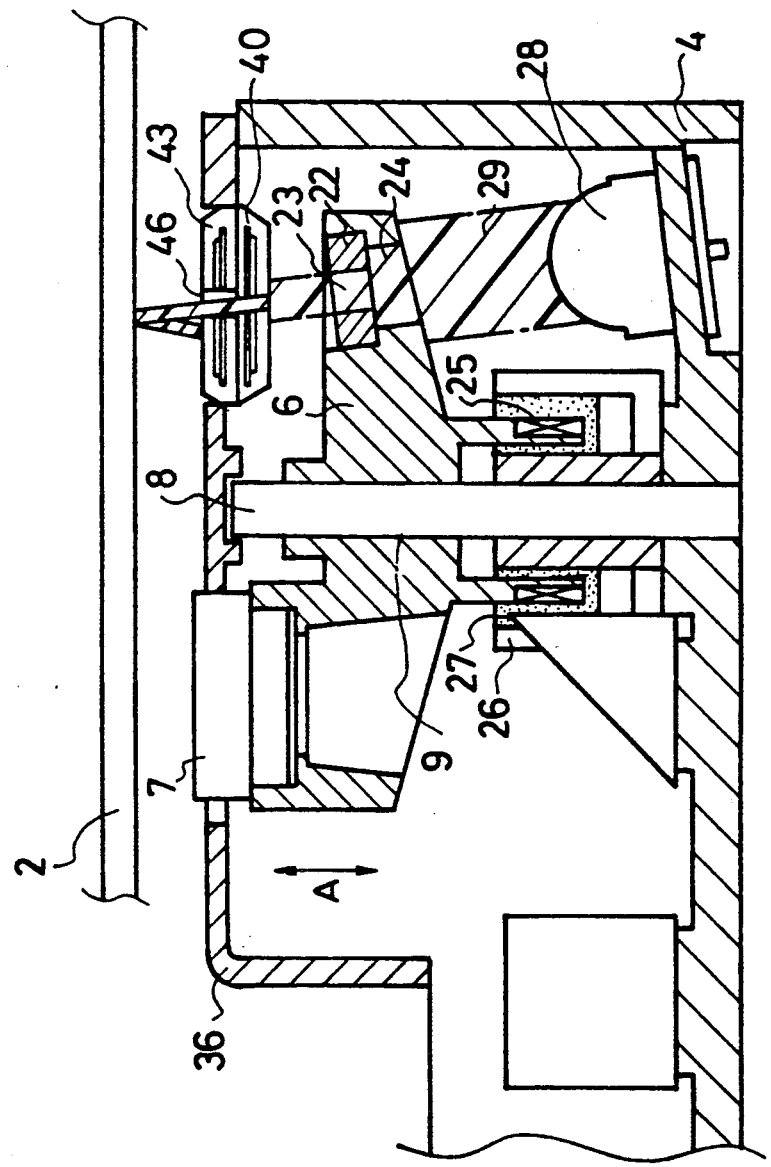

With reference to FIG. 1, FIG. 3, FIG. 6 and FIG. 7, the detection of the inclination angle of the objective lens against the information recording medium 2 will be described. The light beam 29 irradiated from the LED 28 passes through thruholes 23 and 46 and reaches the information recording medium 2. Thereafter, the beam is reflected by the information recording medium 2 and irradiated onto the photo detector 43 for inclination detection to become a light spot 47. The light spot 47 moves in the direction (D in FIG. 6) crossing the parting portion 45 of the light receiving surface 44 at a right angle as the information recording medium 2 is inclined in the tracking follow-up direction of the objective lens 7 as shown in FIG. 3. Then in the same way as the extraction of the position detection signal LPS as described in the foregoing, photoelectrical conversion with the photo detector 43 for inclination detection and the differential amplifier are used to achieve the tilt sensor signal DTS. DTS corresponding to the inclination $\theta_D$ of the objective lens 7 against the information recording medium 2 in the tracking follow-up direction has such a characteristic as shown in FIG. 7. The tracking error signal is corrected with this tilt sensor signal DTS to eliminate a tracking offset and perform proper tracking control.

Embodiment 2

Figure 9:
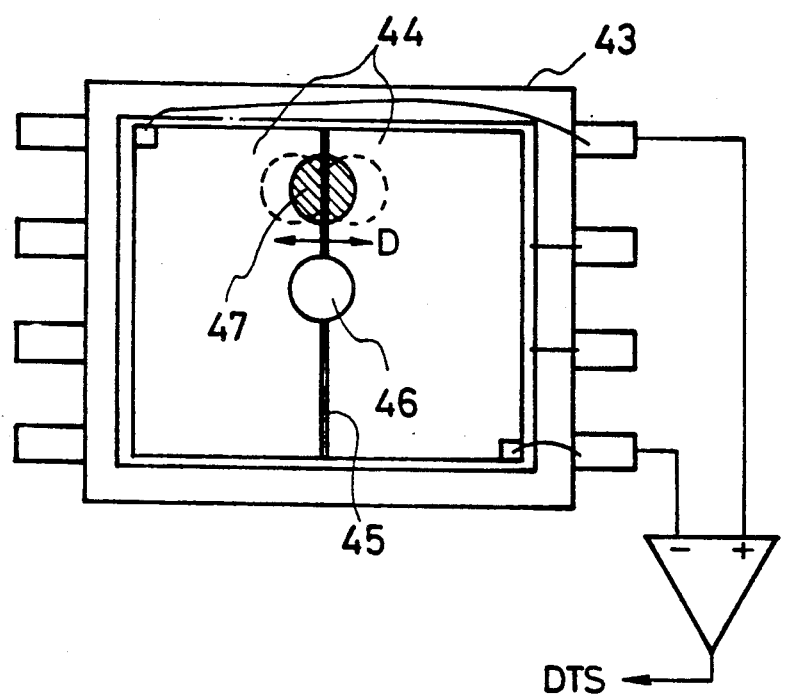
FIG. 9 illustrates the principle of detecting the tilt sensor signal of Embodiment 2.
Figure 10:
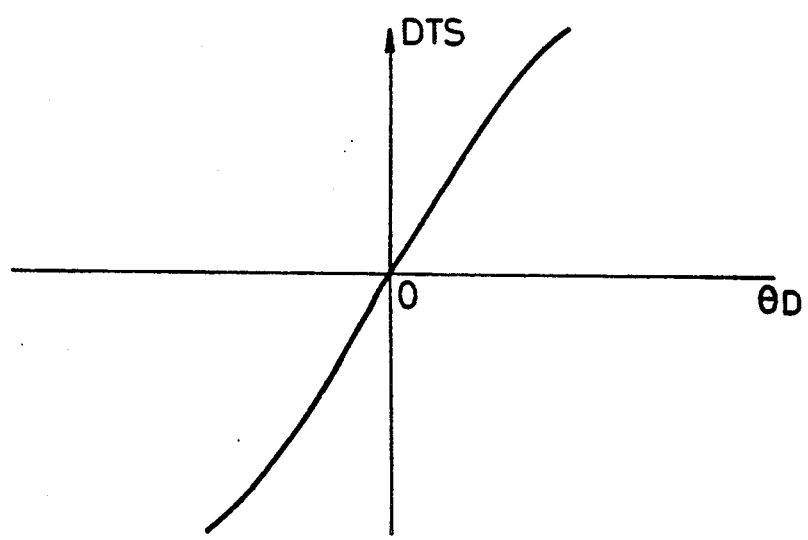
FIG. 10 shows the relationship between the inclination of the objective lens and the tilt sensor signal of Embodiment 2.

FIG. 8 is a sectional view of an optical pick-up inclined against the information recording medium according to another embodiment of the present invention in which the LED 28 for positional detection is attached to the base. FIG. 9 illustrates the principle of detecting the tilt sensor signal, and FIG. 10 shows the relationship between the inclination $\theta$ of the objective lens against the optical disk and the tilt sensor signal DTS.

In the figures, the LED 28 is inclined towards the shaft 8 and fixed to the base 4. The thruhole 24 and the balancer 24 are provided and inclined against the movable holder 6 in accordance with the inclination angle of the light beam 29 irradiated from the LED 28. The diameter of the thruhole 46 may be uniform, but is larger on the side of the photo detector 46 for inclination detection to prevent the light beam from chipping off. Other components are the same as Embodiment 1.

The operation of Embodiment 2 will be described.

The detection of the position of the objective lens in the tracking direction is the same as Embodiment 1, and accordingly, its description will be omitted. With reference to FIGS. 8-10, the detection of the inclination angle of the objective lens against the information recording medium 2 will be described.

The light beam 29 having an inclination angle is first irradiated from the LED 28. The beam passes through the thruholes 23 and 46 and reaches the information recording medium 2. The beam is then reflected by the information recording medium 2 and irradiated onto the photo detector for inclination detection to form the light spot 47. Since the inclined beam 29 is irradiated onto the information recording medium 2, the reflected beam forms the light spot 47 which is off the thruhole 46 in the direction of the parting line 45 of the photo detector 43 for inclination detection.

Then, the light spot 47 moves in the direction (D in FIG. 9) crossing the parting line 45 of the light receiving surface 44 at a right angle as the information recording medium 2 is inclined towards the tracking follow-up direction of the objective lens 7. Thereafter, like Embodiment 1, photoelectrical conversion with the photo detector 43 for inclination detection and the differential amplifier are used to obtain the tilt sensor signal DTS. The characteristic of the tilt sensor signal DTS shown in FIG. 10 is obtained when it is plotted against the inclination angle $\theta_D$ of the objective lens 7 against the information recording medium 2 in the tracking follow-up direction. Then this tilt sensor signal DTS is used to perform proper tracking control. Since the thruhole 46 is outside of the moving range of the light spot 47 on top of the photo detector 43 for inclination detection, the detection accuracy of the inclination angle of the objective lens can be improved as compared with Embodiment 1.

The sum signal of both right and left light receiving surfaces or the photo detector 43 for inclination detection is taken out, and control is performed so that the sum signal becomes constant whereby the linearity of the tilt sensor signal DTS can be improved and the influence of temperature drift can be cancelled. As a result, a more reliable tilt sensor signal DTS can be obtained.

Embodiment 3

Figure 11:
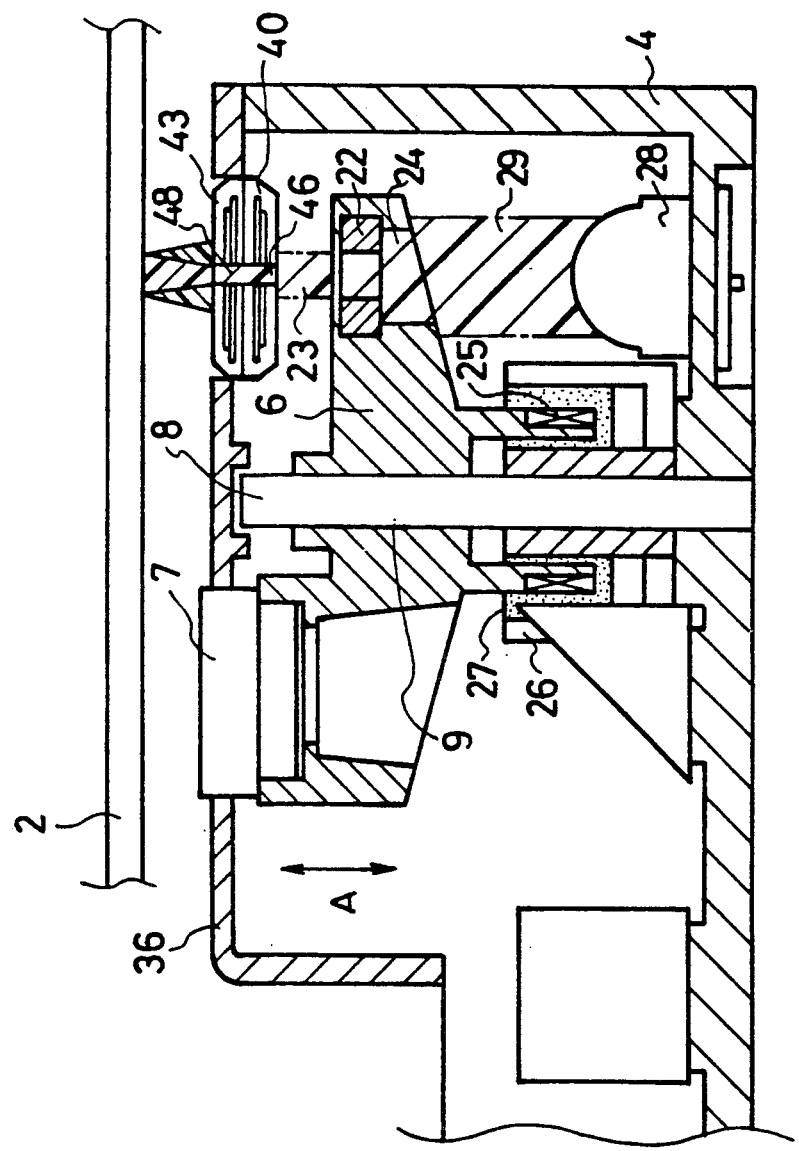
FIG. 11 is a sectional view of the optical pick-up of an optical reading and writing device according to Embodiment 3 of the present invention.
Figure 12:
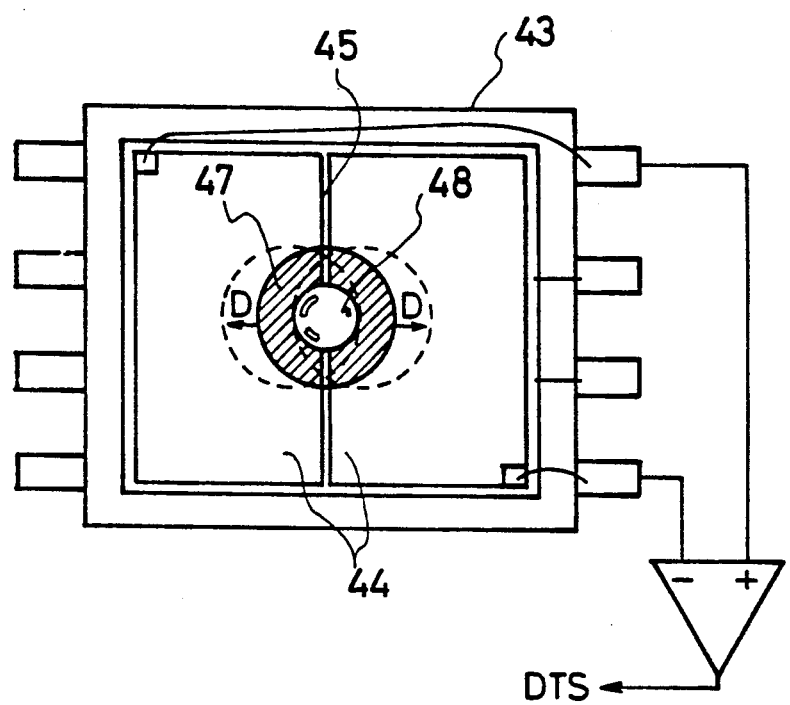
FIG. 12 illustrates the principle of detecting the tilt sensor signal of Embodiment 3.
Figure 13:
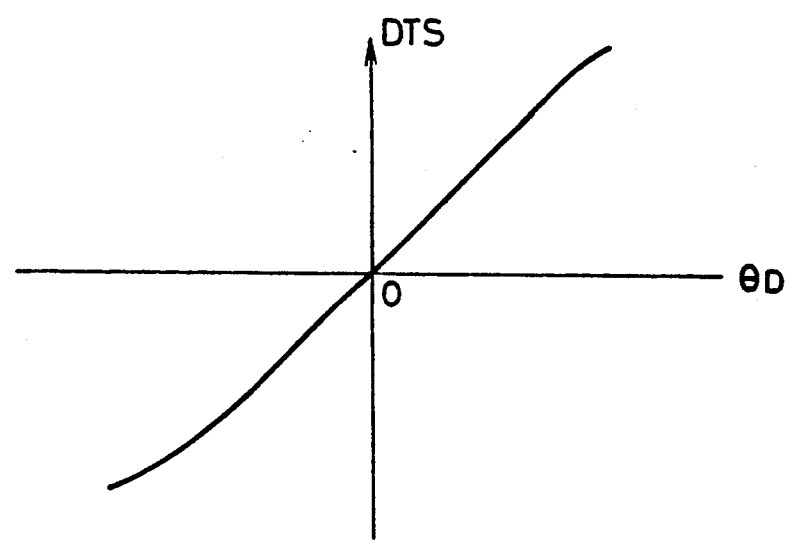
FIG. 13 illustrates the relationship between the inclination of the objective lens and the tilt sensor signal of Embodiment 3.

FIG. 11 is a sectional view of the optical pick-up of an optical reading and writing device according to another embodiment of the present invention. FIG. 12 illustrates the principle of detecting the tilt sensor signal. FIG. 13 illustrates the relationship between the inclination $\theta_D$ of the objective lens against the optical disk and the tilt sensor signal DTS.

In these figures, reference numeral 48 represents a convex lens which is provided within the thruhole 46 close to the information recording medium 2 and is molded together with a package of the photo detector 40 for positional detection and the photo detector 43 for inclination detection into one unit. Other components are the same as Embodiment 1.

The operation of Embodiment 3 will be described.

The detection of the position of the objective lens in the tracking direction is the same as Embodiment 1 and accordingly, its description will be omitted. With reference to FIGS. 11-13, the detection of the inclination angle of the objective lens against the information recording medium 2 will be described hereafter.

The light beam 29 irradiated from the LED 28 first passes through the thruhole 46, is diverged by the convex lens 48 and reaches the information recording medium 2. Thereafter, the beam is reflected by the information recording medium 2 and irradiated onto the detector 43 for inclination detection to form the enlarged light spot 47.

Then, as the information recording medium 2 is inclined in the tracking follow-up direction of the objective lens 7, the light spot 47 moves in the direction (D in FIG. 12) crossing the parting portion 45 of the light receiving surface 44 at a right angle. Afterwards, like Embodiments 1 and 2, the tilt sensor signal DTS is obtained with the photo detector 43 for inclination detection, and exhibits such a characteristic as shown in FIG. 13 when it is plotted against the inclination $\theta_D$ of the objective lens 7 against the information recording medium 2 in the tracking follow-up direction. The tilt sensor signal DTS is used to perform proper tracking control. However, since the irradiation area of the light spot 47 over the photo detector 43 for inclination detection is larger than that of Embodiment 1, the detection accuracy of the inclination angle of the objective lens can be enhanced. In addition, like Embodiment 2, the sum signal of both right and left light receiving surfaces of the photo detector 43 for inclination detection is taken out, and control is performed so that the sum signal becomes constant whereby the linearity of the tilt sensor signal DTS can be improved and the influence of temperature drift can be cancelled. As a result, a more reliable tilt sensor signal DTS can be obtained.

Embodiment 4

Figure 14:
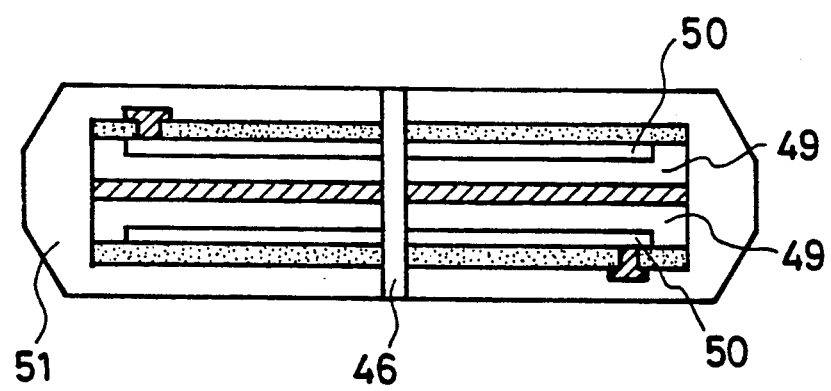
FIG. 14 is a sectional view of a photo detector for positional and inclination angle detection according to Embodiment 4 of the present invention.
Figure 15:
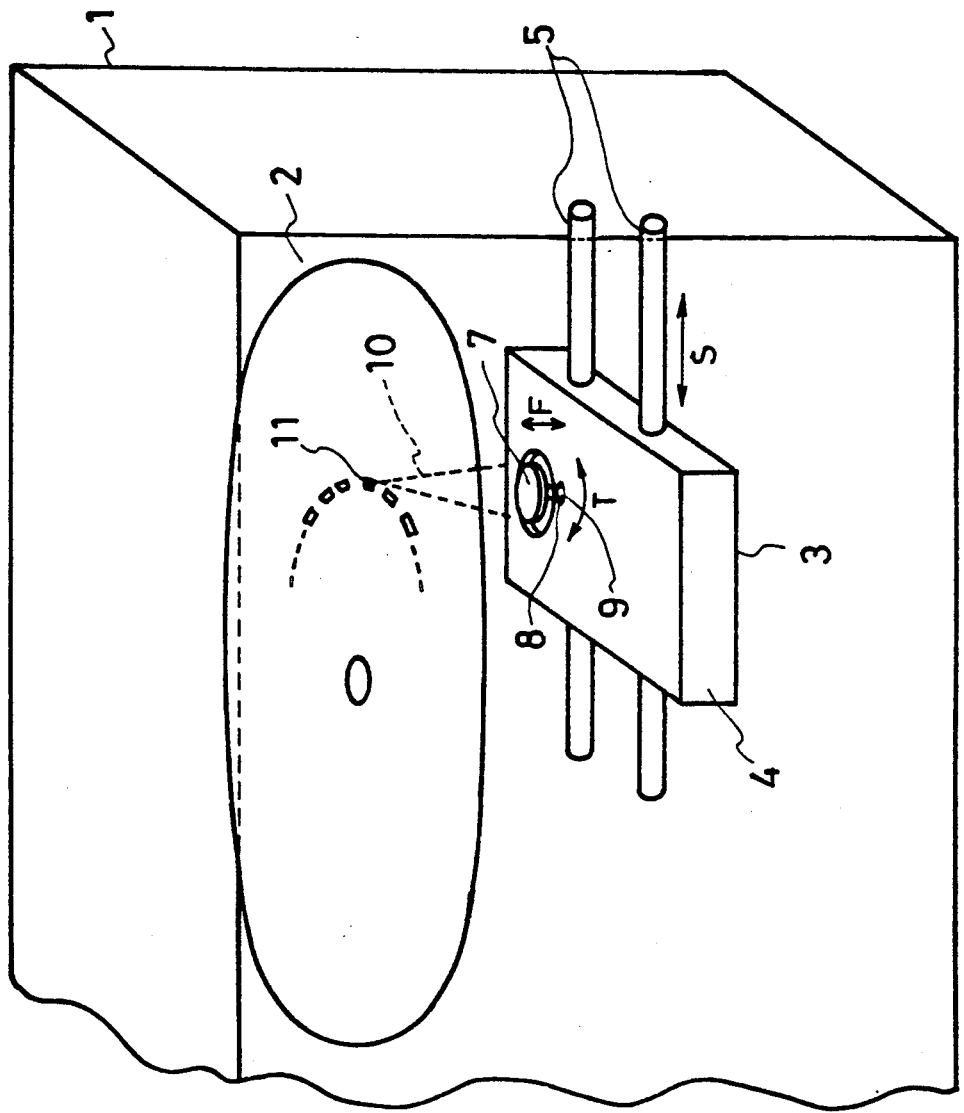
FIG. 15 is an exploded perspective view of the key components of an optical reading and writing device.
Figure 16:
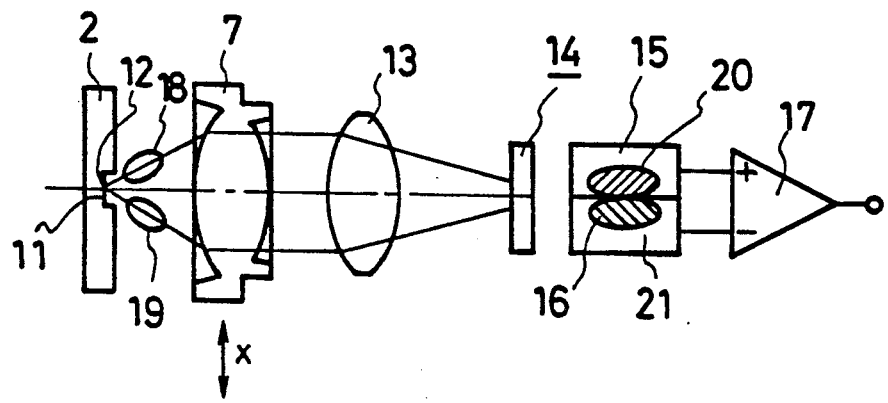
FIG. 16 illustrates the principle of the push-pull method.
Figure 17:
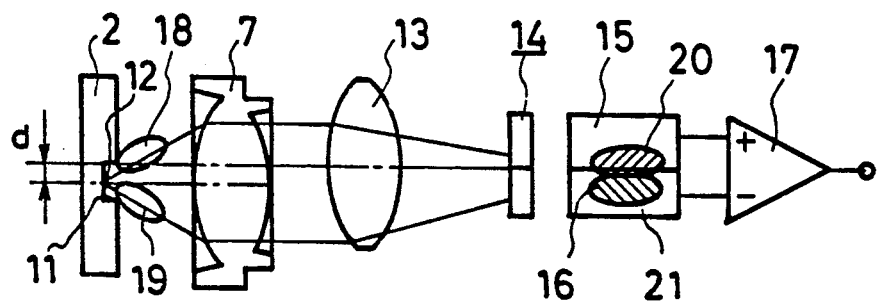
FIG. 17 illustrates the drawback of the push-pull method.
Figure 18:
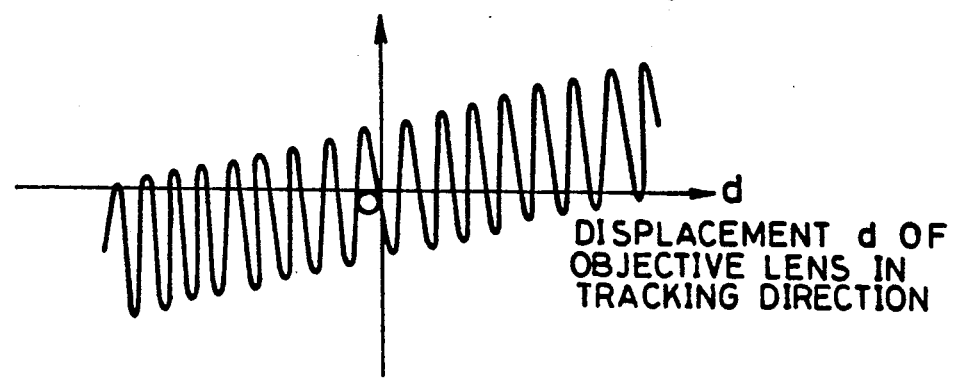
FIG. 18 illustrates the tracking error signal of FIG. 17.
Figure 19:
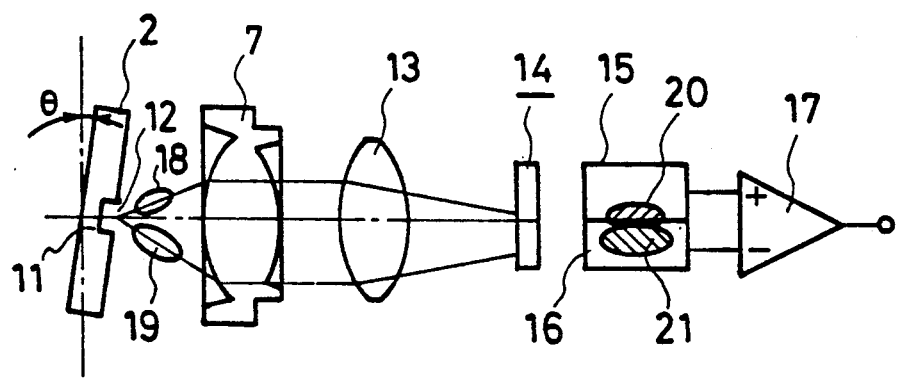
FIG. 19 illustrates the drawback of the push-pull method.
Figure 20:
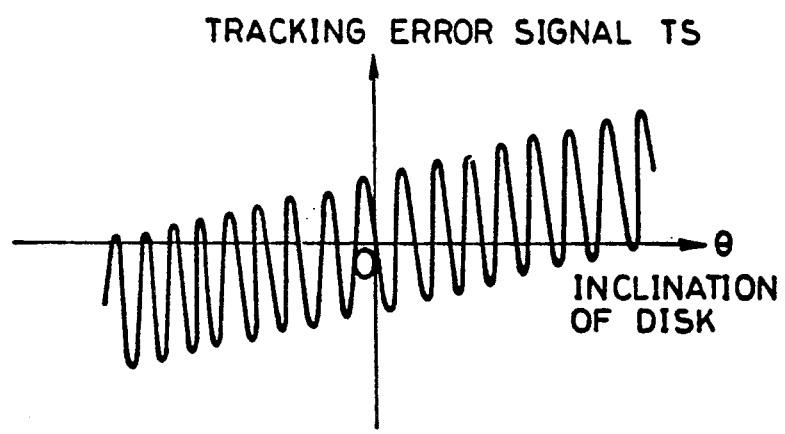
FIG. 20 illustrates the tracking error signal of FIG. 19.
Figure 21:
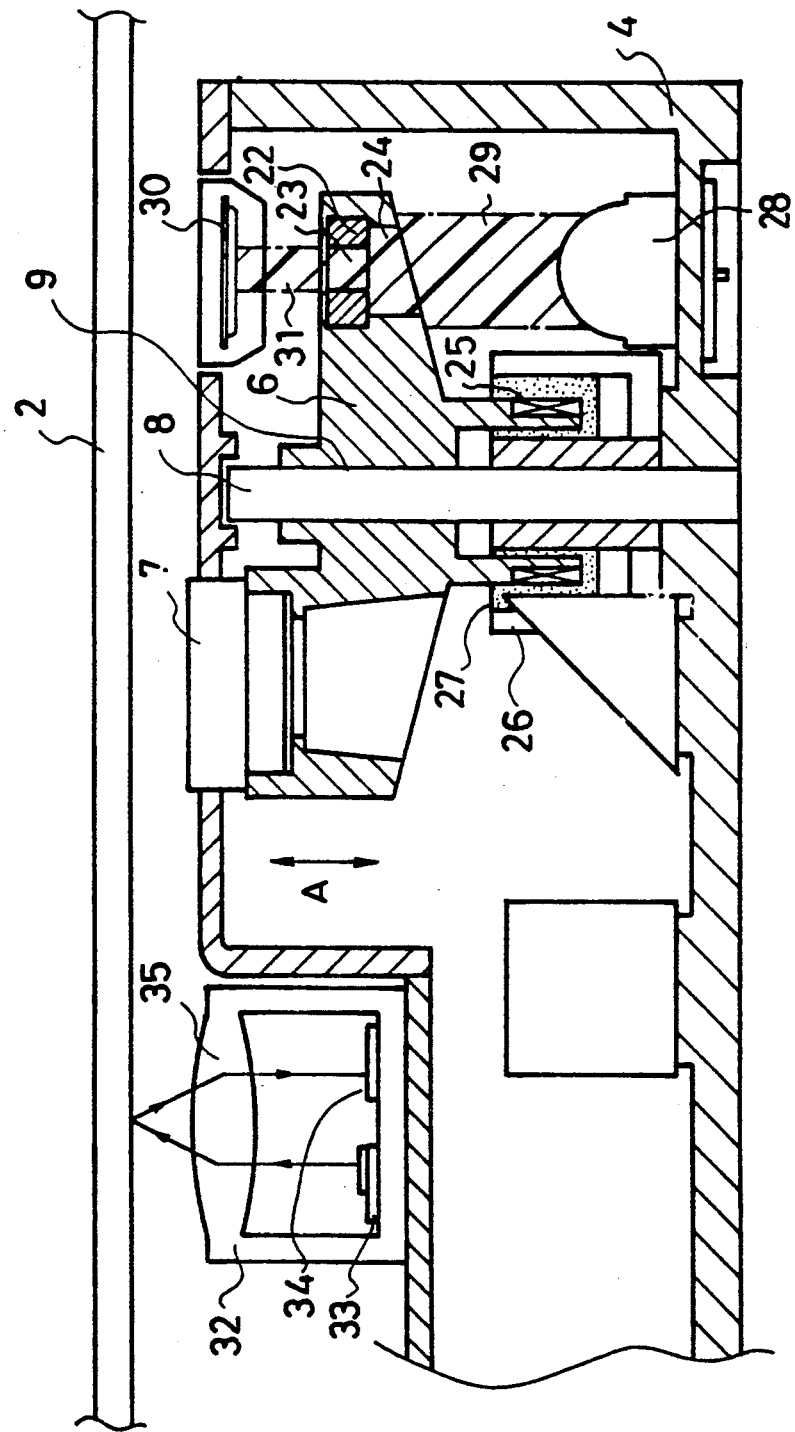
FIG. 21 is a sectional view of an optical pick-up which eliminates the drawback of the conventional push-pull method.
Figure 22:
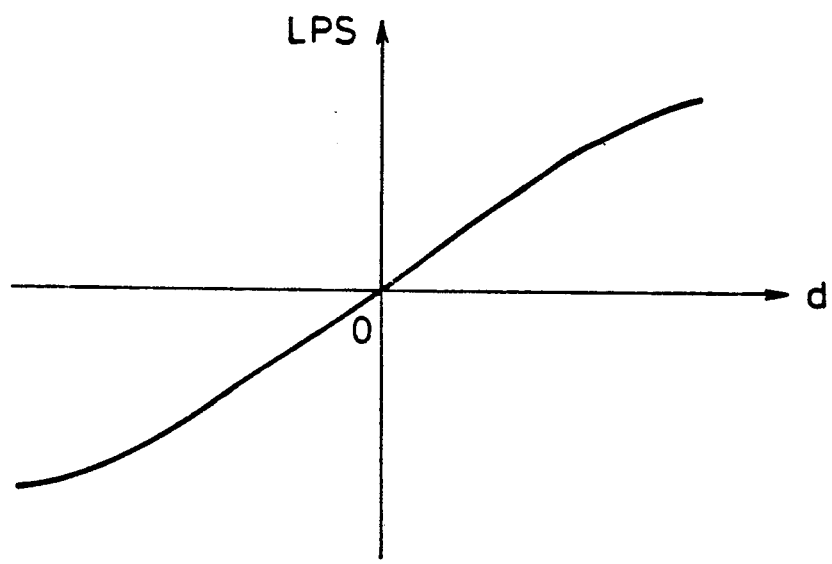
FIG. 22 illustrates the relationship between the displacement of the conventional objective lens and the objective lens position detection signal.
Figure 23:
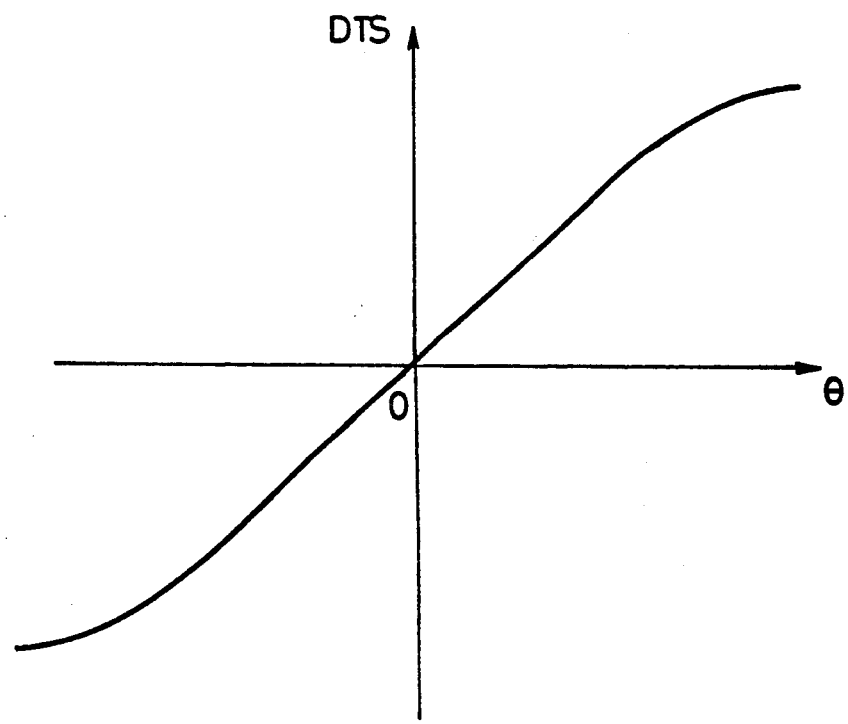
FIG. 23 illustrates the relationship between the inclination of the conventional objective lens and the tilt sensor signal.
Figure 24:
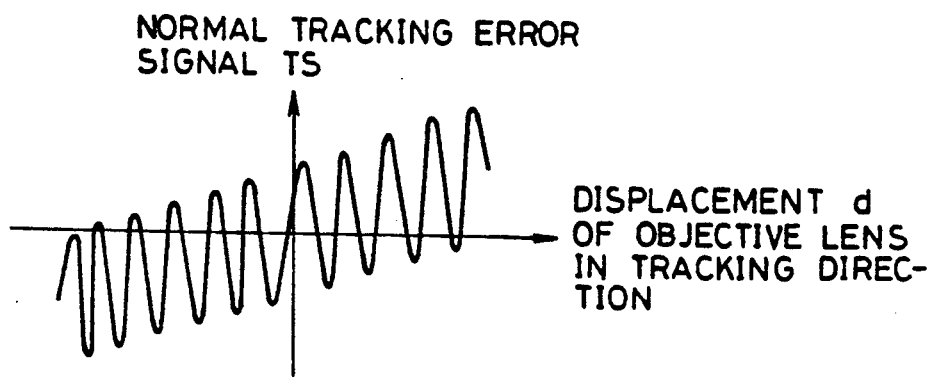
FIG. 24 illustrates the relationship between the displacement of the conventional objective lens and the normal tracking error signal.
Figure 25:
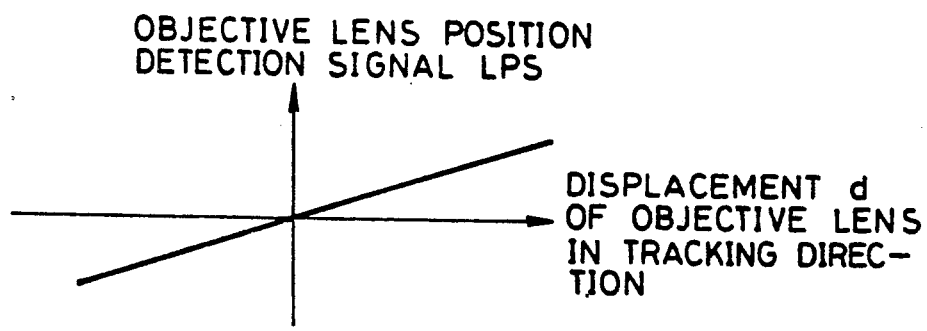
FIG. 25 illustrates the relationship between the displacement of the conventional objective lens and the objective lens position detection signal LPS.
Figure 26:
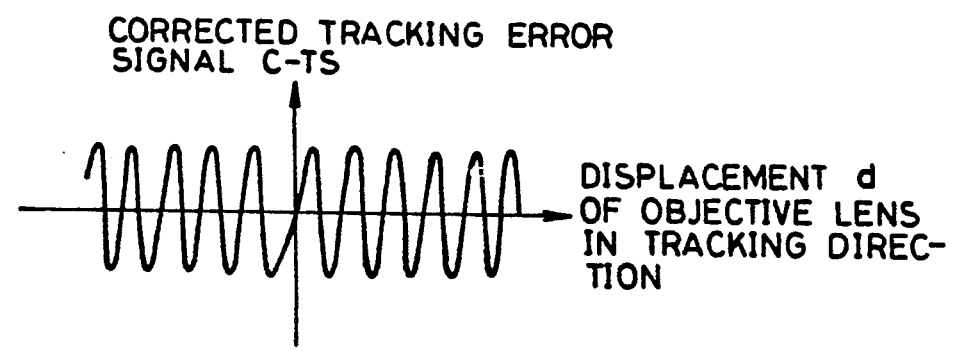
FIG. 26 illustrates the relationship between the displacement of the conventional objective lens and the corrected tracking error signal.

In the above embodiments 1 and 2 and 3, the photo detector 40 for positional detection and the photo detector 43 for inclination detection are accurately positioned and joined together so that the parting portion 45 and the thruhole 46 are aligned with each other. As shown in FIG. 14, an N layer 49 and a P layer 50 are grown on both sides of a single silicon chip to constitute a single package of photo detector 51 for both positional and inclination detections. This structure can reduce the thickness of the photo detector and can improve the positional accuracy of the thruhole and parting line of the light detector.

Since the present invention is structured as described in the foregoing, it has the following effects.

Light irradiated from the light source passes through the first thruhole of the movable member and is received by the first light receiving surface, and at the same time, light passing through the second thruhole and reflected by the information recording medium is received by the second light receiving surface to detect the position and inclination angle of the objective lens against the information recording medium in order to correct a tracking offset, thus making it possible to reduce the number of parts, simplify the structure of an optical reading and writing device, reduce the size of the device, and enhance product design freedom.

In addition, since the light source is inclined against the recording medium, and reflected light from the information recording medium is received by a part of the second light receiving surface other than the second thruhole, the detection accuracy of the inclination angle of the objective lens against the information recording medium can be enhanced.

Furthermore, an optical lens is provided within the second thruhole so that light passing through the second thruhole and reflected by the information recording medium is enlarged and received by the second light receiving surface whereby the detection accuracy of the inclination angle of the objective lens against the information recording medium can be improved.

What is claimed is:

1. An optical reading and writing device comprising an optical information recording disk medium having a light receiving groove, an optical head moving member moving recording medium, a movable member provided on said optical head moving member and having an objective lens as an integral part thereof, a light source provided on said optical head moving member which irradiates light in the direction of said recording medium, a first thruhole provided on said movable member which transmits light from said light source in the direction of said recording medium, and a photo detector having first and second light receiving surfaces and a second thruhole extending through said first and second light receiving surfaces between said first thruhole and said recording medium;

light passing through said first thruhole being received by said first light receiving surface for the detection of the position of said objective lens relative to said light receiving groove; and light passing through said second thruhole and reflected by said recording medium being received by said second light receiving surface for the detection of the inclination angle of said objective lens relative to said recording medium.

2. The optical reading and writing device according to claim 1, wherein said light source is inclined against said recording medium, and wherein light passing through said second thruhole and reflected by said recording medium is received by a part of said second light receiving surface other than said second thruhole.

3. The optical reading and writing device according to claim 1, wherein an optical lens is provided in said second thruhole to enlarge light passing through said thruhole which is then reflected by said recording medium and received by said second light receiving surface.

* * * * *